Figure 1:
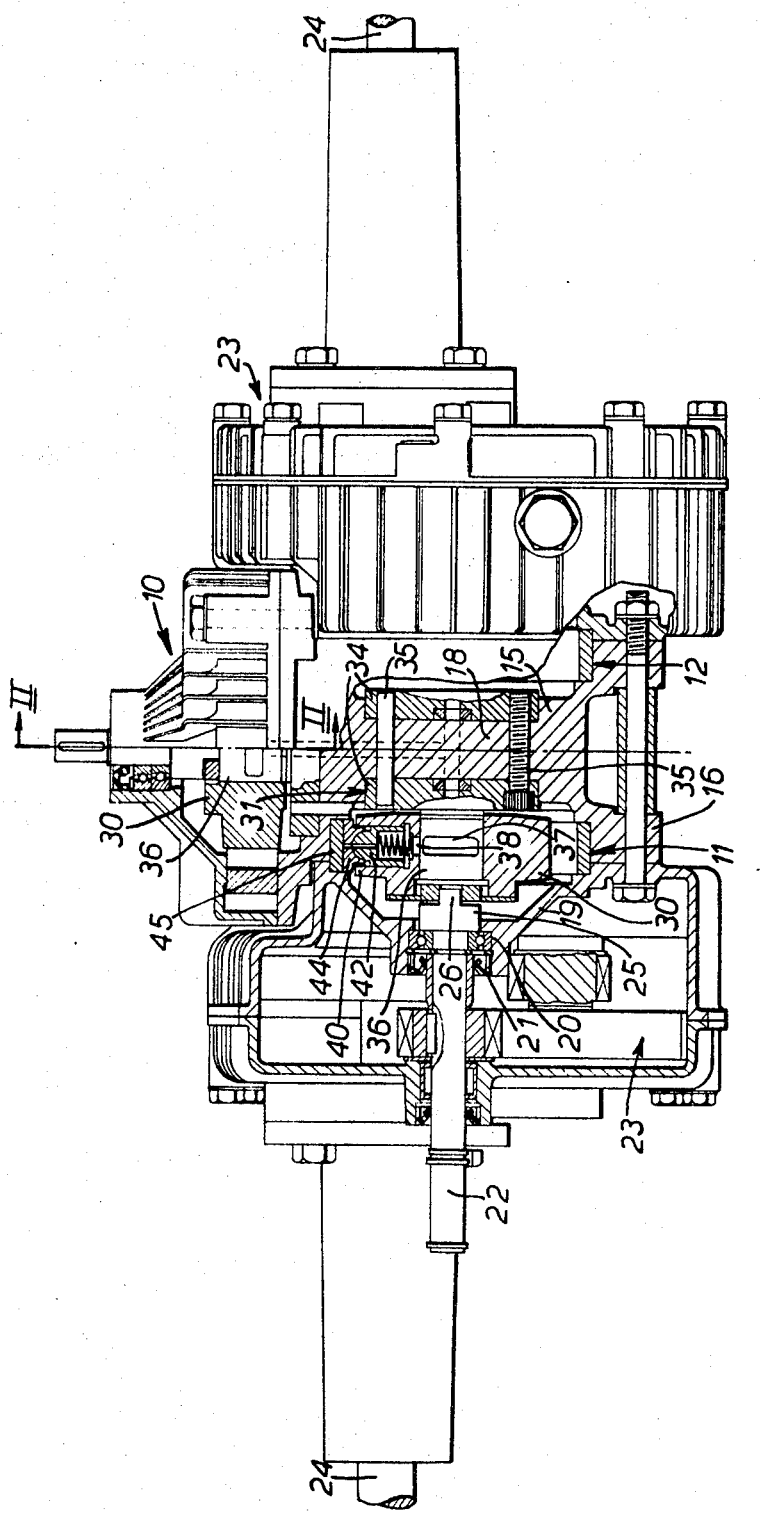

United States Patent [19]
Brown et al.

[11] 3,751,924
[45] Aug. 14, 1973

[54] HYDROSTATIC TRANSMISSIONS

[75] Inventors: Peter Henry Brown; Derek Ivor Webb, both of Cheltenham, England

[73] Assignee: Hydro-Mite Limited, Lansdown Industrial Estate, Cheltenham, Gloucestershire, England

[22] Filed: Oct. 5, 1971

[21] Appl. No.: 186,753

[30] Foreign Application Priority Data
Oct. 8, 1970 Great Britain .................. 47,882/70

[52] U.S. Cl. .................................... 60/485, 60/487
[51] Int. Cl. ............................................ F15b 39/16
[58] Field of Search ................ 60/53 B, 520 S, 487, 60/485

[56] References Cited
UNITED STATES PATENTS
2,163,079   6/1939   Benedek ........................... 60/53 B
2,255,963   9/1941   Benedek ........................... 60/53 B
3,165,069   1/1965   Adamek ......................... 60/53 B X
3,464,205   9/1969   Henry-Biabaud .................. 60/53 B

*Primary Examiner*—Edgar W. Geoghegan
*Attorney*—William D. Hall, Elliott I. Pollock et al.

[57] ABSTRACT

A hydrostatic transmission comprising a rotary radial piston pump combined with a rotary radial piston motor, each rotary unit comprising a rotary cylinder member mounted on a non-rotating pintle having fluid ports formed therein, the pintles of the two rotary units being separately formed and attached to a common housing or support.

3 Claims, 3 Drawing Figures

HYDROSTATIC TRANSMISSIONS

This invention relates to hydrostatic transmissions of the type comprising a rotary hydraulic pump combined with a rotary hydraulic motor, the two units being so interconnected by fluid conduits that power can be transmitted through the transmission from the pump to the motor.

The invention is particularly concerned with hydrostatic transmissions of the type including a rotary radial piston pump combined with a rotary radial piston motor. Such rotary units normally comprise a rotary cylinder member mounted on a non-rotating pintle. Conventional units are somewhat expensive to manufacture and time-consuming to assemble, and suffer from various disadvantages such as leakage problems, excessive dimensions, and a tendency to failure from overstressing. It is an object of the invention to provide an improved hydrostatic transmission of the general type referred to which will overcome or reduce some of the existing difficulties, and which may also offer certain advantages such as flexibility in design.

Broadly the invention consists in a hydrostatic transmission comprising a rotary radial piston pump combined with a rotary radial piston motor, each rotary unit comprising a rotary cylinder member mounted on a non-rotary pintle having fluid ports formed therein, the pintles of the two rotary units being separately formed and attached to a common housing or support.

The invention can conveniently be applied to arrangements in which the rotary axes of the two units are inclined, or perpendicular. Thus in one particular construction according to the invention the transmission includes a pump positioned perpendicular to and between a pair of aligned motors, forming a "T" configuration, all three pintles being separately attached to a common housing or support.

In any case the rotary cylinder members are conveniently connected to drive shafts extending from the remote opposite ends of the two rotary units, and according to another preferred feature of the invention each pintle is mounted in a closed recess in the support or housing. The motor and pump units may be of identical construction thus permitting right-angle, in-line, or "T" configuration transmissions to be assembled from standard units.

Figure 2:
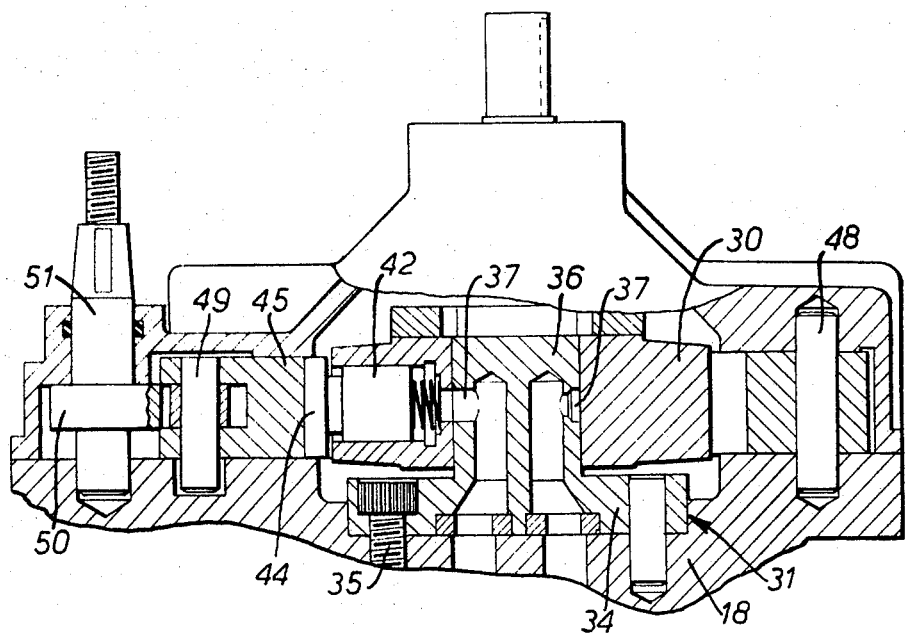
Figure 3:
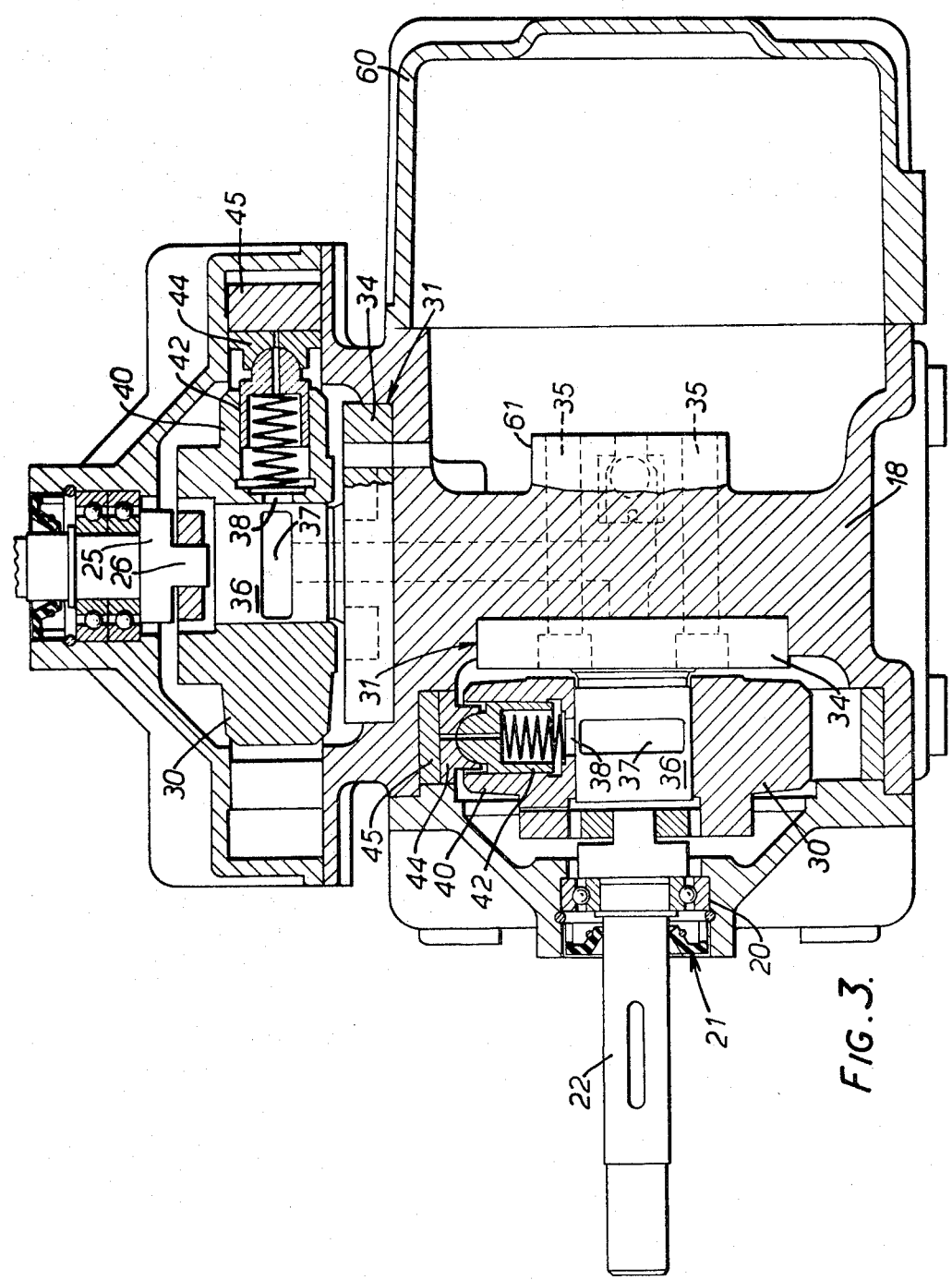

The invention may be performed in various ways and a number of embodiments will now be described by way of example with reference to the accompanying drawings, in which:

FIG. 1 is a plan view, partly in section, of a T-configuration power transmission unit according to the invention, FIG. 2 is a fragmentary cross-section on the line II—II in FIG. 1, and FIG. 3 is a plan view of another embodiment of the invention constructed to provide a right-angle drive.

In the first embodiment illustrated in FIGS. 1 and 2 the invention is applied to a hydrostatic transmission of "T" configuration comprising a rotary radial piston pump 10 combined with a pair of rotary radial piston motors 11, 12, the motors being arranged co-axially back-to-back, and the pump positioned on a perpendicular axis intercepting the motor axis between the two motors. This transmission configuration is particularly suitable as a final drive transmission unit for a small vehicle such as a garden tractor or lawn mower.

The pump and the two motors are essentially of similar construction with minor points of difference as described below and it is convenient first to describe the motor 10 in some detail.

The motor is housed in a casing defined partly by an end wall 15 and surrounding flange 16 forming part of a common central housing or mounting block 18 for the complete unit, and partly by a separate casing member 19 attached thereto. The casing member 19 has a central aperture provided with a bearing 20 and seal 21 through which extends a drive shaft 22, which in the present example is connected through reduction gearing indicated generally at 23 to an output shaft 24 intended to be attached to a driving wheel of the vehicle. The inner end of the drive shaft 22 is provided with a flange 25 formed with a transverse slot or rib 26 forming part of an Oldham coupling designed to transmit torque between the end of the drive shaft and a rotary cylinder member 30 of the motor mounted within the casing.

The main central housing member 18 has a circular recess 31 in its end wall opposite the cover 19, and in this recess is mounted a stationary pintle having a circular flange or base 34 which is securely located by bolts 35 in the recess, and a projecting stub shaft 36 which acts as a bearing support for the rotary cylinder member 30. The pintle is also formed with two internal hydraulic fluid flow passages (not shown) extending parallel to its length, each passage terminating in a port at one end to co-operate with one of two hydraulic flow passages in the end wall 15 of the housing, and a further port 37 at the other end designed to co-operate with radial ports 38 in the rotary cylinder member, to act as timing control ports as the rotor rotates. The flow ports or passages in the first mentioned end of the pintle may be provided with surrounding O-rings to form fluid seals with the co-operating face of the recess 31 but it will be appreciated that leakage would in any case be confined within the casing since the pintle is bodily contained within the housing.

The rotary cylinder member 30 in this example has five spaced projecting bosses 40 each formed with an open cylinder extending radially inwards from the outer end, and a central cylindrical bore or cavity designed to fit over the projecting end of the pintle 36. The radial passages or ports 38 extend inwards from the inner ends of the cylinders into the central bore and co-operate with the timing ports 37 on the pintle to control the supply and discharge of hydraulic fluid. Each cylinder contains a piston 42 formed with a hollow skirt extending radially inwardly and a compression spring is seated within the skirt and bears against the inner end of each cylinder to urge each piston radially outwards. The outer end of each piston is formed with a part-spherical ball designed to fit in a corresponding part-spherical socket in a bearing slipper 44, so as to act as a universal joint.

The external bearing surface of each slipper is of part cylindrical form and bears against the inner surface of an annular cam ring 45 and to ensure adequate lubrication this bearing surface is provided with oil distribution and throttling passages receiving lubricating oil from the adjacent cylinder via passages in the piston.

The central common housing member or block 18, to which the three pintles of the pump and motors are attached, is formed with internal "T" shaped supply and return passages (not shown) by which fluid from the pump is delivered in parallel to the two motors and returned from the motors to the pump. Since all three units are of the same size and capacity this provides a 2:1 speed reduction. A further reduction is provided by the mechanical reduction gears 23 associated with each of the motors 11, 12.

The pintles are secured in the recesses 31 of the common housing by the bolts 35 passing through the housing and in addition to the advantages mentioned above this has the further advantage that each pintle can be "matched" with its associated rotary cylinder member as a separate assembly, before the final assembly of all the components into the complete transmission unit.

As mentioned above the pump 10 is arranged to be capable of adjustment to vary its capacity and thus vary the speed ratio of the transmission. For this purpose the cam track or cam ring 45 of the pump is adjustably positioned in the casing on a pivot 48 (see FIG. 2) at one side, extending parallel to the rotary axis, and the other side of the cam ring is provided with a projecting pin 49 engaging a slot in an adjusting arm 50 attached to a rocking spindle 51 operated externally, for example, by a manual control lever. Movement of this lever thus causes the complete cam ring 45 to swing through a small angle about its pivot 48 so as to vary the eccentricity of the cam ring and so the effective capacity of the pump.

In the second embodiment of the invention illustrated in FIG. 3 the transmission is in many ways similar to that described above, and like parts are illustrated by the same reference numerals, but in this case it takes the form of a right-angled drive and the drive motor 12 is omitted. The position occupied by this drive motor is here taken by a hollow casing 60 attached to the common housing 18 to form a closed container which acts as an oil reservoir. In this example the part of the housing 18 which defines an end wall of the reservoir, and which in the previous example received and located one of the pintles, is arranged to receive a disc 61 housing a pair of non-return valves for the supply and return passages between the pump and the other motor. This unit is thus a self-contained fully sealed unit which requires no external fluid circuit. A breather (not shown) may be fitted if required.

In a further embodiment according to the invention (not illustrated) a pump and motor pair are arranged back-to-back in an in-line configuration, and in this example the unit is conveniently based again on the "T" configuration described above in connection with FIGS. 1 and 2, but with the perpendicular pump 10 omitted and the two motors 11, 12 modified merely to form a pump-motor combination. For this purpose the supply and return passages to the omitted motor are closed off, and may be fitted with non-return valves.

What we claim is:

1. A hydrostatic transmission assembly comprising a rotary radial piston pump and a rotary radial piston motor, the said pump and motor each including a non-rotating pintle and a rotary cylinder member mounted for rotation on the said pintle and provided with a plurality of radial cylinders each containing an individual radially movable piston, each pintle having fluid supply and return passages extending lengthwise thereof and communicating respectively with supply and return ports in the external surface of the said pintle, to permit the flow of liquid to and from the said cylinders on rotation of the respective cylinder members, said support member being formed with internal fluid supply and return passages communicating respectively with corresponding passages in said two pintles, and in which the said two pintles are separately formed and identical, and the assembly includes a common support member having two faces lying in mutually perpendicular planes, means mounting the said pintles respectively on the said mounting faces with the axes of the pintles perpendicular to one another, a casing for each of said pump and motor units, said casings being respectively secured and sealed to said common support member to surround the respective rotary cylinder members, drive shafts extending through said casings and respectively connected through universal couplings to said rotary cylinder members, bearings supporting said drive shafts respectively from said casings, adjusting means within the said casing surrounding said pump for varying the volumetric capacity thereof, and control means extending through an aperture in said casing and operatively connected to said adjusting means.

2. A transmission assembly according to claim 1, including a second identical rotary radial piston motor, and wherein said common support member has a third mounting face, parallel with and on the side of said support member opposite from the said face to which the pintle of the first said motor is mounted, and means for mounting the pintle of said second motor on said third face with the axis of said pintle aligned with the pintle of said first motor; said support member being formed with additional supply and return passages communicating between said pump and said second motor.

3. A transmission assembly according to claim 1, in which the said motor includes an annular cam ring surrounding the respective cylinder member, and said pistons of said motor engage the said cam ring, and in which the said cam ring is mounted in a recess formed in said support member surrounding the respective mounting face to which the pintle of said motor is mounted.

* * * * *